US012533825B2

(12) United States Patent
Tepale Castillo

(10) Patent No.: US 12,533,825 B2
(45) Date of Patent: Jan. 27, 2026

(54) AVOCADO SLICING APPARATUS

(71) Applicant: Miguel Angel Tepale Castillo, Passaic, NJ (US)

(72) Inventor: Miguel Angel Tepale Castillo, Passaic, NJ (US)

( * ) Notice: Subject to any disclaimer, the term of this patent is extended or adjusted under 35 U.S.C. 154(b) by 190 days.

(21) Appl. No.: 18/207,212

(22) Filed: Jun. 8, 2023

(65) Prior Publication Data

US 2024/0408782 A1 Dec. 12, 2024

(51) Int. Cl.

| | |
|---|---|
| ***B26D 3/30*** | (2006.01) |
| ***B26D 3/26*** | (2006.01) |
| ***B26D 5/10*** | (2006.01) |

(52) U.S. Cl.

CPC ................. *B26D 3/30* (2013.01); *B26D 3/26* (2013.01); *B26D 5/10* (2013.01)

(58) Field of Classification Search

CPC ............... B26D 3/30; B26D 3/26; B26D 5/10

See application file for complete search history.

(56) References Cited

U.S. PATENT DOCUMENTS

| | | | | |
|---|---|---|---|---|
| 5,287,784 A * | 2/1994 | Brockett | A47J 47/00 | 83/762 |
| 2004/0211306 A1* | 10/2004 | Woods | B26D 3/30 | 83/454 |
| 2006/0207403 A1* | 9/2006 | Moss | B26B 3/04 | 83/870 |

FOREIGN PATENT DOCUMENTS

| | | | |
|---|---|---|---|
| DE | 102011084170 A1 * | 4/2013 | B26D 3/26 |
| EP | 2946700 | 11/2015 | |

OTHER PUBLICATIONS

DE_102011084170_A1 (Year: 2013).*

* cited by examiner

*Primary Examiner* — Jonathan G Riley

(57) ABSTRACT

An avocado slicing apparatus for slicing an avocado includes a casing with a clamshell shape. The casing is closable around an avocado to hold the avocado in a chamber formed between a top shell and a bottom shell of the casing. A track is coupled to and extends along a rim of the bottom shell. A slider is slidably coupled to the track. A blade is coupled to the slider and extends inwardly from the slider with respect to the rim of the bottom shell. The blade has a cutting edge positioned such that the blade is configured to slice the avocado circumferentially when the slider is moved along the track.

13 Claims, 7 Drawing Sheets

AVOCADO SLICING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to food slicing tools and more particularly pertains to a new food slicing tool for slicing an avocado.

(2) Description of Related Art Including Information Disclosed Under 37 CFR 1.97 and 1.98

The prior art relates to food slicing tools for slicing avocados and includes apparatuses for slicing an avocado which include at least one blade for cutting into the avocado and slicing the avocado circumferentially around the pit of the avocado. However, the prior art does not describe such an apparatus which includes a clamshell casing which forms a chamber for containing the avocado and a blade which is slidably coupled to a rim of one shell of the casing to slide around the avocado. Such an apparatus would be desirable over the prior art for its ease of use, economy of parts, and the casing which facilitates gripping of the avocado without risking the user cutting his or her hand.

BRIEF SUMMARY OF THE INVENTION

An embodiment of the disclosure meets the needs presented above by generally comprising a casing with a clamshell shape. The casing comprises a top shell and a bottom shell. The top and bottom shells are pivotally interconnected, and each of the top and bottom shells has a bowl shape. The casing is positionable in a closed configuration wherein the top and bottom shells form a chamber therebetween. The chamber has a size such that the casing is configured for holding an avocado in the chamber. A track is coupled to and extends along a rim of the bottom shell. A slider is slidably coupled to the track. A blade is coupled to the slider and extends inwardly from the slider with respect to the rim of the bottom shell. The blade has a cutting edge positioned such that the blade is configured to slice the avocado circumferentially when the slider is moved along the track.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
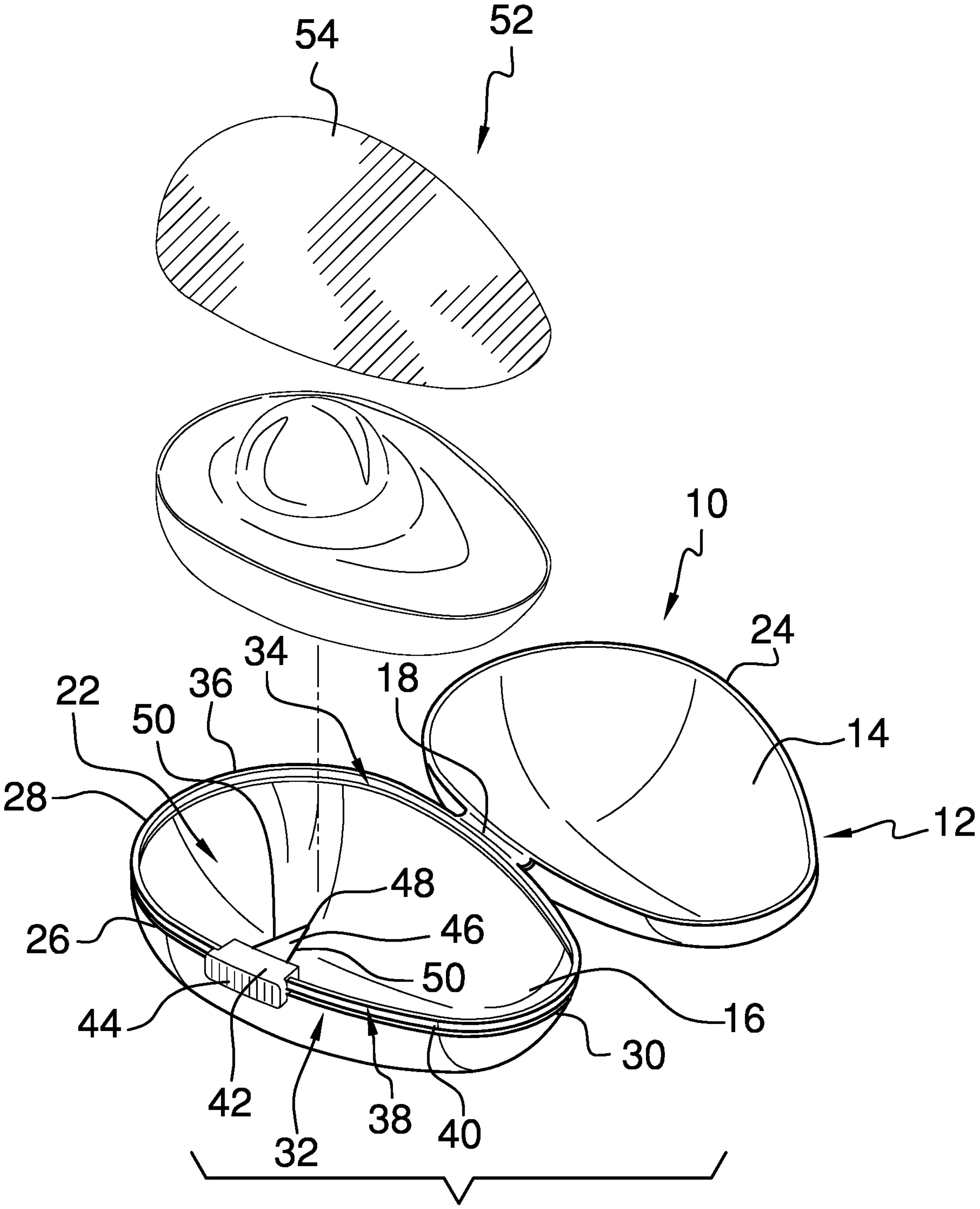
FIG. 1 is a perspective in-use view of an avocado slicing apparatus according to an embodiment of the disclosure.
Figure 2:
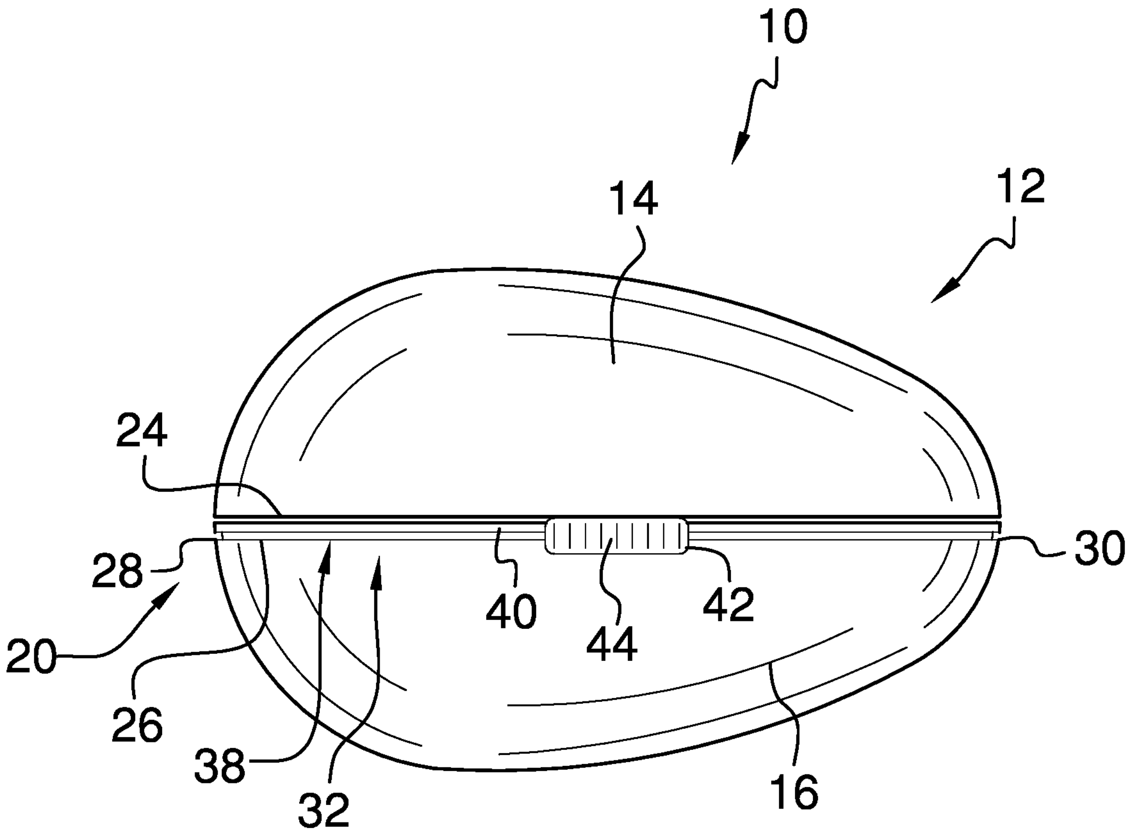
FIG. 2 is a front view of an embodiment of the disclosure with a casing being positioned in a closed configuration.
Figure 3:
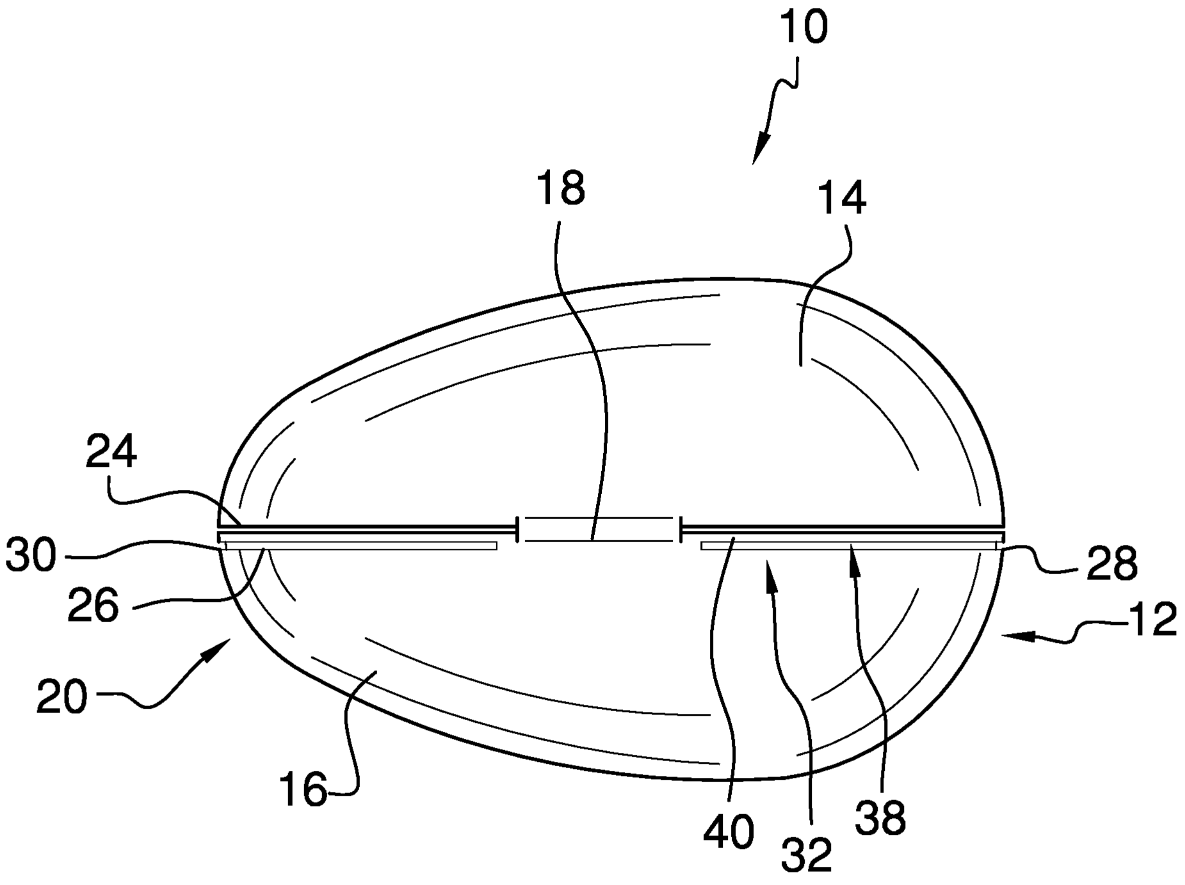
FIG. 3 is a back view of the casing of an embodiment of the disclosure with the casing being positioned in the closed configuration.
Figure 4:
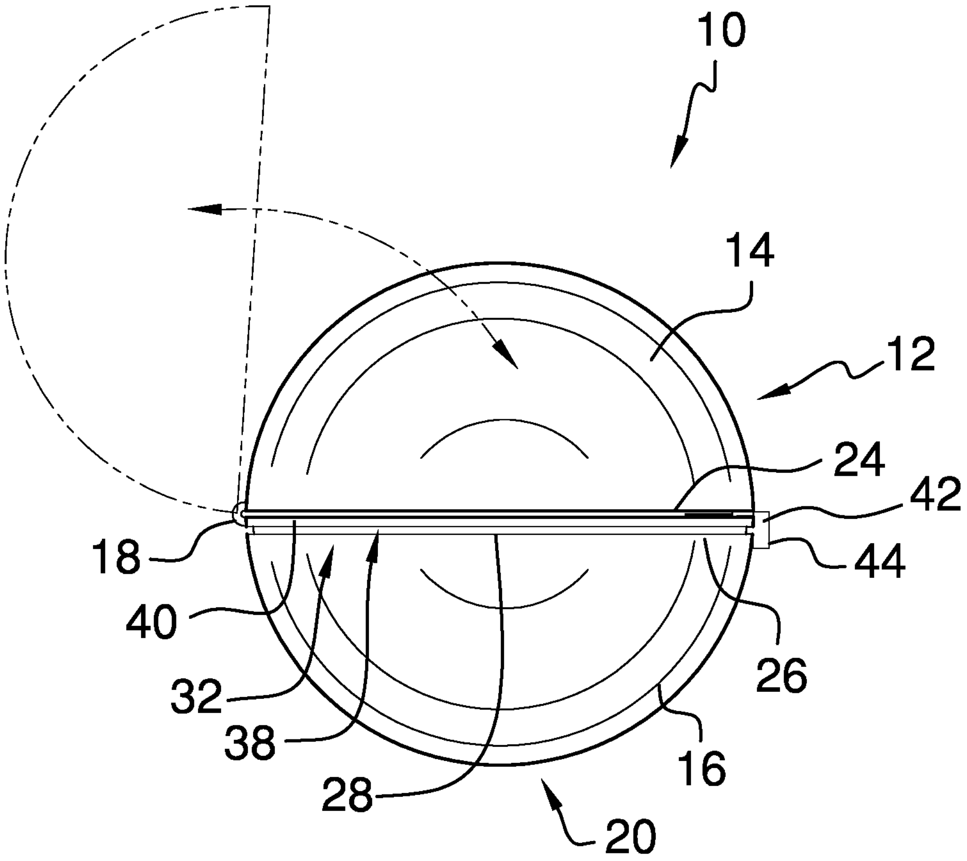
FIG. 4 is a side view of the casing of an embodiment of the disclosure with the casing being positioned in the closed configuration.
Figure 5:
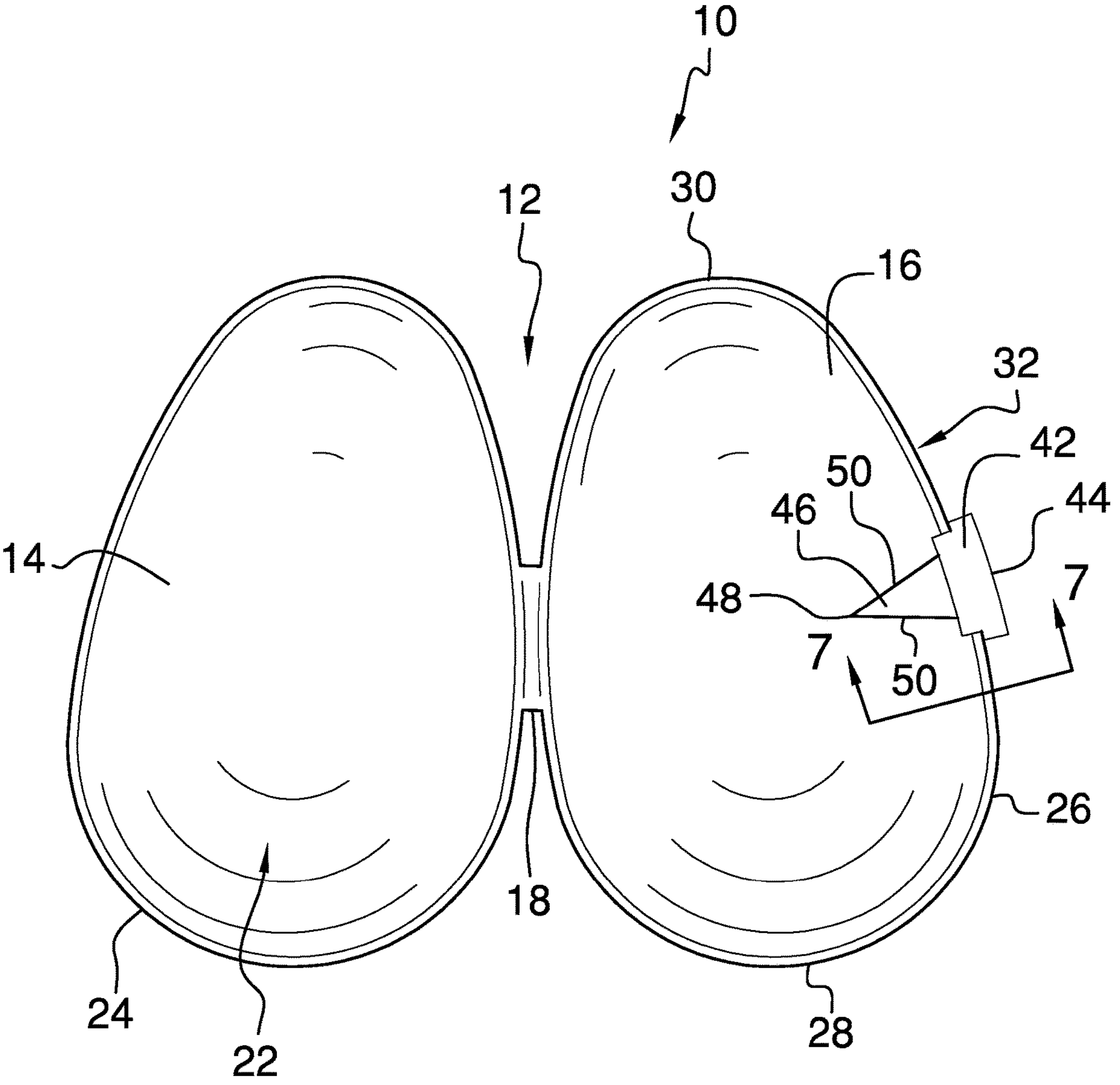
FIG. 5 is a top view of an embodiment of the disclosure.
Figure 6:
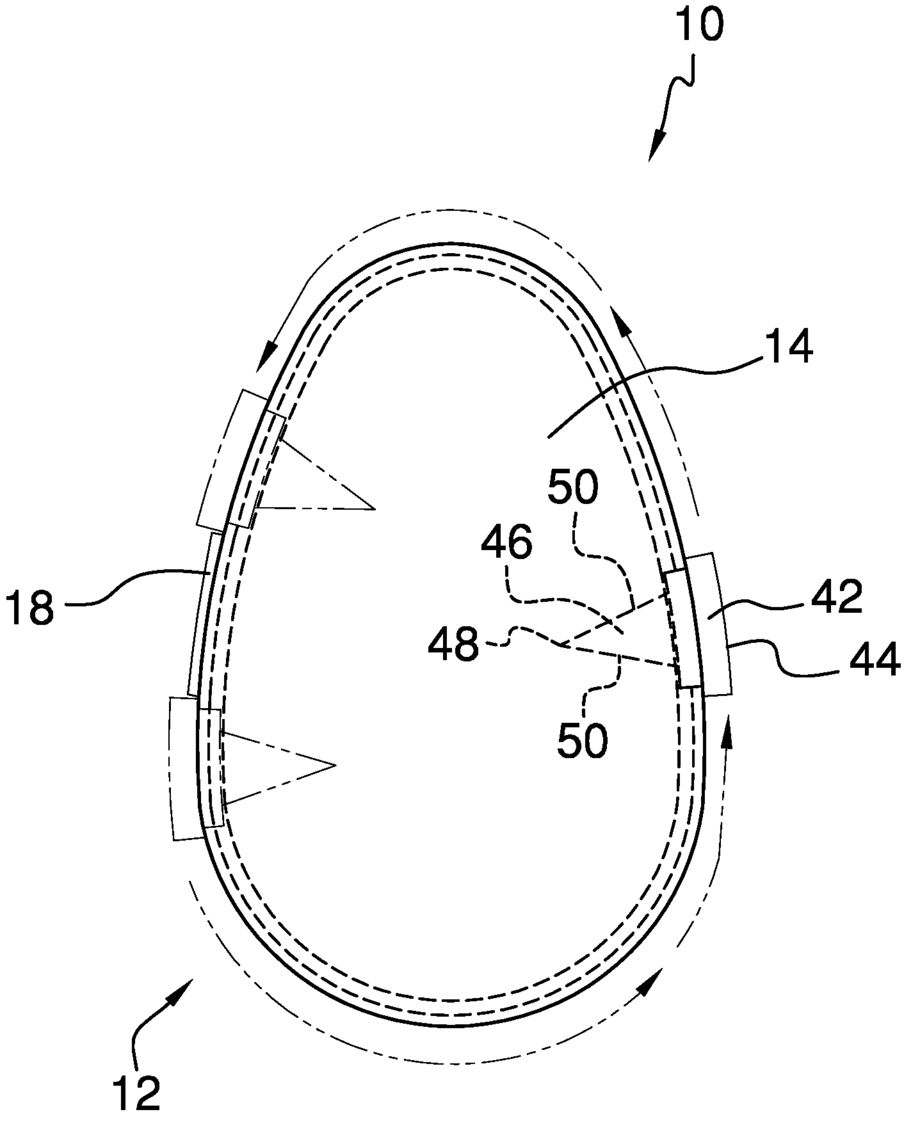
FIG. 6 is a top view of an embodiment of the disclosure with the casing being positioned in the closed configuration illustrating the path of motion of a slider along a track.
Figure 7:
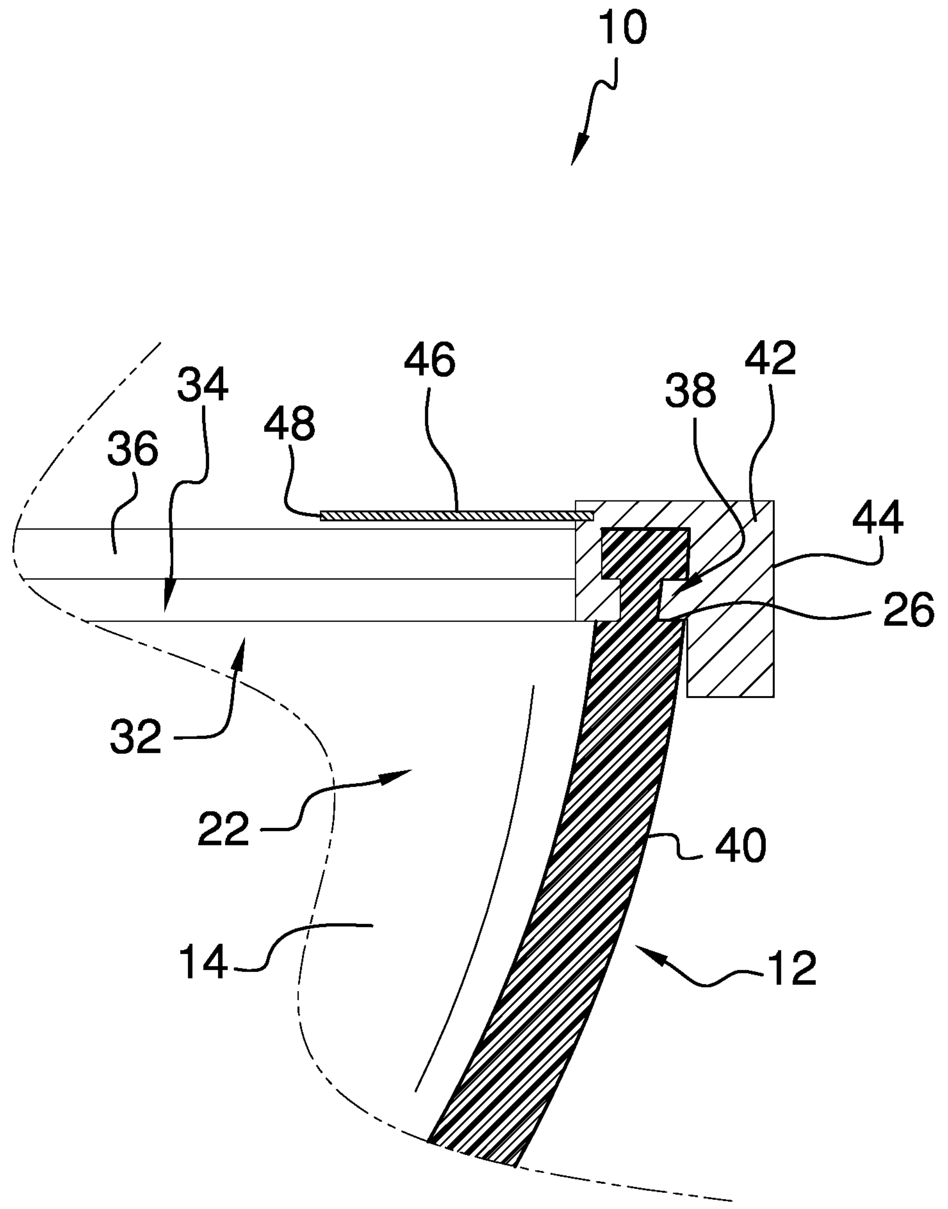
FIG. 7 is a cross-section view of an embodiment of the disclosure taken from Arrows 7-7 in FIG. 5.

With reference now to the drawings, and in particular to FIGS. 1 through 7 thereof, a new food slicing tool embodying the principles and concepts of an embodiment of the disclosure and generally designated by the reference numeral 10 will be described.

As best illustrated in FIGS. 1 through 7, the avocado slicing apparatus 10 generally comprises a casing 12 with a clamshell shape. The casing 12 comprises a top shell 14 and a bottom shell 16. The top and bottom shells 14, 16 are pivotally interconnected, and each of the top and bottom shells 14, 16 has a bowl shape. The casing 12 is positionable in a closed configuration 20 wherein the top and bottom shells 14, 16 form a chamber 22 therebetween. The chamber 22 has a size such that the casing 12 is configured for holding an avocado 52 in the chamber 22. A rim 24 of the top shell 14 lies adjacent to a rim 26 of the bottom shell 16 when the casing 12 is positioned in the closed configuration 20. The chamber 22 is elongated in a direction parallel to the rim 26 of the bottom shell 16 and has an ovoid shape, wherein a first radius of the rim 26 of the bottom shell 16 at a first end 28 of the rim 26 of the bottom shell 16 is greater than a second radius of the rim 26 of the bottom shell 16 at a second end 30 of the rim 26 of the bottom shell 16 opposite the first end 28. The casing 12 further comprises a hinge 18 pivotally coupling the rim 24 of the top shell 14 and the rim 26 of the bottom shell 16 together. The hinge 18 is positioned centrally between the first and second ends 30 of the rim 26 of the bottom shell 16. The hinge 18 comprises a bendable material such that the top shell 14 is pivotable with respect to the bottom shell 16, and the top shell 14 forms a unitary structure with the hinge 18 and the bottom shell 16. For example, the casing 12 may be formed of a molded plastic, wherein the hinge 18 has a thickness such that said hinge 18 is bendable.

A track 32 is coupled to and extends along the rim 26 of the bottom shell 16. The track 32 has an interior groove 34 extending into an interior side 36 of the track 32 with respect to the rim 26 of the bottom shell 16 and an exterior groove 38 extending into an exterior side 40 of the track 32 with respect to the rim 26 of the bottom shell 16. A slider 42 is slidably coupled to the track 32 and has a grip surface 44 facing outwardly away from the bottom shell 16. The slider 42 engages the interior groove 34 and the exterior groove 38. A blade 46 is coupled to the slider 42. The blade 46 extends inwardly from the slider 42 with respect to the rim 26 of the bottom shell 16 and terminates in a pointed end 48. The blade 46 has a pair of opposing cutting edges 50 extending between the pointed end 48 and the slider 42.

In use, the avocado 52 is positioned in the bottom shell 16 such that the pointed end 48 of the blade 46 pierces an exterior surface 54 of the avocado 52. The casing 12 is positioned in the closed configuration 20 by moving the top shell 14 opposite the bottom shell 16 across the bottom shell 16, thereby forming the chamber 22 between the top and bottom shells 14, 16 and positioning the avocado 52 in the chamber 22. The slider 42 is moved along the track 32 to urge one of the pair of opposing cutting edges 50 to slice the avocado 52 circumferentially.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An avocado slicing apparatus comprising:

a casing having a clamshell shape, the casing comprising a top shell and a bottom shell, the top and bottom shells being pivotally interconnected, each of the top and bottom shells having a bowl shape, the casing being positionable in a closed configuration wherein the top and bottom shells form a chamber therebetween, the chamber having a size such that the casing is configured for holding an avocado in the chamber;

a track being coupled to and extending along a rim of the bottom shell, the track having an exterior groove extending into an exterior side of the track with respect to the rim of the bottom shell;

a slider being slidably coupled to the track, the slider engaging the exterior groove; and a blade being coupled to the slider, the blade extending inwardly from the slider with respect to the rim of the bottom shell, the blade having a cutting edge positioned such that the blade is configured to slice the avocado circumferentially when the slider is moved along the track.

2. The apparatus of claim 1, wherein a rim of the top shell lies adjacent to the rim of the bottom shell when the casing is positioned in the closed configuration.

3. The apparatus of claim 1, wherein the chamber is elongated in a direction parallel to the rim of the bottom shell.

4. The apparatus of claim 1, wherein the chamber has an ovoid shape.

5. The apparatus of claim 4, wherein a first radius of the rim of the bottom shell at a first end of the rim of the bottom shell is greater than a second radius of the rim of the bottom shell at a second end of the rim of the bottom shell opposite the first end.

6. The apparatus of claim 1, wherein the casing further comprises a hinge pivotally coupling the rim of the top shell and the rim of the bottom shell together.

7. The apparatus of claim 6, wherein the hinge is positioned centrally between the first and second ends of the rim of the bottom shell.

8. The apparatus of claim 6, wherein the hinge comprises a bendable material such that the top shell is pivotable with respect to the bottom shell, the top shell forming a unitary structure with the hinge and the bottom shell.

9. The apparatus of claim 1, wherein the track has an interior groove extending into an interior side of the track with respect to the rim of the bottom shell, the slider engaging the interior groove.

10. The apparatus of claim 1, wherein the slider has a grip surface facing outwardly away from the bottom shell.

11. The apparatus of claim 1, wherein the blade extends inwardly from the slider with respect to the rim of the bottom shell and terminates in a pointed end.

12. The apparatus of claim 11, wherein the blade has a pair of opposing cutting edges extending between the pointed end and the slider.

13. An avocado slicing apparatus comprising:

a casing having a clamshell shape, the casing comprising a top shell and a bottom shell, the top and bottom shells being pivotally interconnected, each of the top and bottom shells having a bowl shape, the casing being positionable in a closed configuration wherein the top and bottom shells form a chamber therebetween, the chamber having a size such that the casing is configured for holding an avocado in the chamber, a rim of the top shell lying adjacent to a rim of the bottom shell when the casing is positioned in the closed configuration, the chamber being elongated in a direction parallel to the rim of the bottom shell, the chamber having an ovoid shape, a first radius of the rim of the bottom shell at a first end of the rim of the bottom shell being greater than a second radius of the rim of the bottom shell at a second end of the rim of the bottom shell opposite the first end, the casing further comprising a hinge pivotally coupling the rim of the top shell and the rim of the bottom shell together, the hinge being positioned centrally between the first and second ends of the rim of the bottom shell, the hinge comprising a bendable material such that the top shell is pivotable with respect to the bottom shell, the top shell forming a unitary structure with the hinge and the bottom shell;

a track being coupled to and extending along the rim of the bottom shell, the track having an interior groove extending into an interior side of the track with respect to the rim of the bottom shell, the track having an exterior groove extending into an exterior side of the track with respect to the rim of the bottom shell;

a slider being slidably coupled to the track, the slider having a grip surface facing outwardly away from the bottom shell, the slider engaging the interior groove, the slider engaging the exterior groove; and a blade being coupled to the slider, the blade extending inwardly from the slider with respect to the rim of the bottom shell and terminates in a pointed end, the cutting edge being one of a pair of opposing cutting edges extending between the pointed end and the slider.

* * * * *